US 6,725,338 B2

(12) United States Patent
Gomez et al.

(10) Patent No.: US 6,725,338 B2
(45) Date of Patent: Apr. 20, 2004

(54) METHOD AND APPARATUS FOR PREVENTING CACHE POLLUTION IN MICROPROCESSORS WITH SPECULATIVE ADDRESS LOADS

(75) Inventors: Christopher A. Gomez, Cupertino, CA (US); Wayne I. Yamamoto, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 206 days.

(21) Appl. No.: 09/992,085

(22) Filed: Nov. 19, 2001

(65) Prior Publication Data

US 2002/0062426 A1 May 23, 2002

Related U.S. Application Data

(60) Provisional application No. 60/252,307, filed on Nov. 21, 2000.

(51) Int. Cl.[7] ............................................. G06F 12/00
(52) U.S. Cl. ...................... 711/137; 711/138; 711/140; 711/154; 712/235
(58) Field of Search ................................. 711/137, 140, 711/169, 154; 717/154; 712/235; 74/133, 138

(56) References Cited

U.S. PATENT DOCUMENTS

| | | | | |
|---|---|---|---|---|
| 5,420,991 A | * | 5/1995 | Konigsfeld et al. | 711/150 |
| 5,826,109 A | * | 10/1998 | Abramson et al. | 710/39 |
| 5,870,599 A | * | 2/1999 | Hinton et al. | 712/239 |
| 6,098,166 A | * | 8/2000 | Leibholz et al. | 712/216 |
| 6,418,516 B1 | * | 7/2002 | Arimilli et al. | 711/138 |
| 6,438,656 B1 | * | 8/2002 | Arimilli et al. | 711/137 |
| 6,473,833 B1 | * | 10/2002 | Arimilli et al. | 711/122 |
| 6,487,637 B1 | * | 11/2002 | Arimilli et al. | 711/133 |
| 6,516,462 B1 | * | 2/2003 | Okunev et al. | 717/154 |
| 6,542,988 B1 | * | 4/2003 | Tremblay et al. | 712/225 |

OTHER PUBLICATIONS

Gupta et al., "Improving Instruction Behavior by reducing Cache Pollution", ©1990 IEEE, pp. 82–91.*
Hwang et al., "An X86 Load/store Unit with Aggressive Scheduling of Load/store Operations", ©1998IEEE, pp. 1–8.*
Reinman et al., "Predictive Techniques for Aggressive Load Speculation", ©1998 IEEE, pp. 1–11.*
Franklin et al., "ARB: A Hardware Mechanism of Dynamic Reordering of Memory Reference", ©1996 IEEE, pp. 552–571.*
Farkas et al., How Useful are Non-blocking Loads, Stream Buffers and Speculative Execution in Multiple Issue Processors?, ©1995 IEEE, pp. 78–89.*

* cited by examiner

*Primary Examiner*—Donald Sparks
*Assistant Examiner*—Brian R. Peugh
(74) *Attorney, Agent, or Firm*—Rosenthal & Osha L.L.P.

(57) ABSTRACT

A method of optimizing speculative address load processing by a microprocessor includes identifying a speculative load, marking the speculative load, determining whether a miss occurs for the speculative load, and preventing use of the marked speculative load by the microprocessor if a miss occurs. A method of optimizing speculative address load processing by a microprocessor includes identifying a speculative load, marking the speculative load, inserting the marked speculative load into a load miss queue, determining whether a miss occurs for the speculative load, and preventing the load miss queue from committing the marked speculative load to cache if a miss occurs.

12 Claims, 5 Drawing Sheets

F - Inst. Fetch
D - Inst. Decode
O - Operand Read
A - Address Calculation
$ - Cache Access
H/M - Cache hit/Miss Determination
LMB - insert into LMB F - Inst. Fetch
D - Inst. Decode
O - Operand Read
A - Address Calculation
$ - Cache Access
H/M - Cache hit/Miss Determination
LMB - insert into LMB

METHOD AND APPARATUS FOR PREVENTING CACHE POLLUTION IN MICROPROCESSORS WITH SPECULATIVE ADDRESS LOADS

CROSS-REFERENCE TO RELATED APPLICATIONS

This application claims benefit of U.S. Provisional Application No. 60/252,307, entitled "Method and Apparatus for Preventing Cache Pollution in Microprocessors With Speculative Address Loads," filed Nov. 21, 2000.

BACKGROUND OF INVENTION

Generally, a microprocessor operates much faster than main memory can supply data to the microprocessor. Therefore, many computer systems temporarily store recently and frequently used data in smaller, but much faster cache memory. Cache memory may reside directly on the microprocessor chip (L1 cache) or may be external to the microprocessor (L2 cache).

Referring to FIG. 1, a typical computer system includes a microprocessor (also referred to herein and known as "processor") (10) having, among other things, a CPU (12), a load/store unit (14), an on-board cache memory (16), and a load miss buffer (LMB) (17) for holding loads that miss in the on-board cache while they are accessing main memory. The microprocessor (10) is connected to a main memory (18) that holds data and program instructions to be executed by the microprocessor (10). Internally, the execution of program instructions are carried out by the CPU (12). Data needed by the CPU (12) to carry out an instruction are fetched by the load/store unit (14). Upon command from the CPU (12), the load/store unit (14) searches for the data first in the cache memory (16), then in main memory (18). Finding the data in cache memory is referred to as a "hit." Not finding the data in cache memory is referred to as a "miss." Loads that miss in the cache are moved to the Load Miss Buffer (LMB) from which they are picked to access memory, wait for the return of data, and then commit the data into the caches.

Speculation is the use of data before it is known whether the data is really correct. Microprocessors use speculation to speed up the rate of computation. For instance, a microprocessor can speculate on the outcome of an operation that will provide data to calculate a load address. In doing this, the processor can dispatch the load access earlier and, if the speculation was correct, complete the load operation sooner. If the speculation was incorrect, the load is reissued when the correct value is known.

Speculative address loads are loads that are issued with an effective address generated from speculative data. For example, a consumer load is speculatively issued before its producer has validated its calculation. In this situation, the consumer load uses speculative data to form an effective address and then proceeds to execute and access the cache. If it turns out that the speculation was incorrect, the access to the cache may have altered the cache. This can occur if the speculative load access misses in the cache which causes the processor to bring in data relating to the incorrect effective address. Bringing in this data may replace other data in the cache that will be accessed in the near future. So when the processor goes to access the replaced data, it will no longer be in the cache and will incur a cache miss which would not have occurred without the speculation. This is referred to as "cache pollution."

SUMMARY OF INVENTION

In general, in one aspect, the present invention involves a method of optimizing speculative address load processing by a microprocessor comprising identifying a speculative load, marking the speculative load, determining whether a miss occurs for the speculative load, and preventing use of the speculative load if a miss occurs.

In general, in one aspect, the present invention involves a method of optimizing speculative address load processing by a microprocessor comprising identifying a speculative load, marking the speculative load, inserting the load into a load miss queue, determining whether a miss occurs for the speculative load, and preventing the load miss queue from committing the speculative load to cache if a miss occurs.

In general, in one aspect, the present invention involves a microprocessor designer for optimized speculative address load processing by a microprocessor, the system comprising a program stored on computer-readable media for identifying a speculative load, marking the speculative load, determining whether a miss occurs for the speculative load, and preventing use of the speculative load if a miss occurs.

In general, in one aspect, the present invention involves a microprocessor designed for optimized speculative address load processing by a microprocessor, the system comprising a program stored on computer-readable media for identifying a speculative load, marking the speculative load, inserting the load into a load miss queue, determining whether a miss occurs for the speculative load, and preventing the load miss queue from committing the speculative load to cache if a miss occurs.

In general, in one aspect, the present invention involves a system for optimizing speculative address load processing by a microprocessor comprising means for identifying a speculative load, means for marking the speculative load, means for determining whether a miss occurs for the speculative load, and means for preventing use of the speculative load if a miss occurs.

In general, in one aspect, the present invention involves a system for optimizing speculative address load processing by a microprocessor comprising means for identifying a speculative load, means for marking the speculative load, means for inserting the load into a load miss queue, means for determining whether a miss occurs for the speculative load, and means for preventing the load miss queue from committing the speculative load to cache if a miss occurs.

In general, in one aspect, the present invention involves a computer for speculative address load processing comprising a microprocessor in communication with a main memory; the microprocessor comprising a central processing unit for identifying a speculative load; marking the speculative load; determining whether a miss occurs for the speculative load; and preventing use of the speculative load if a miss occurs.

Other aspects and advantages of the invention will be apparent from the following description and the appended claims.

DETAILED DESCRIPTION

Figure 1:
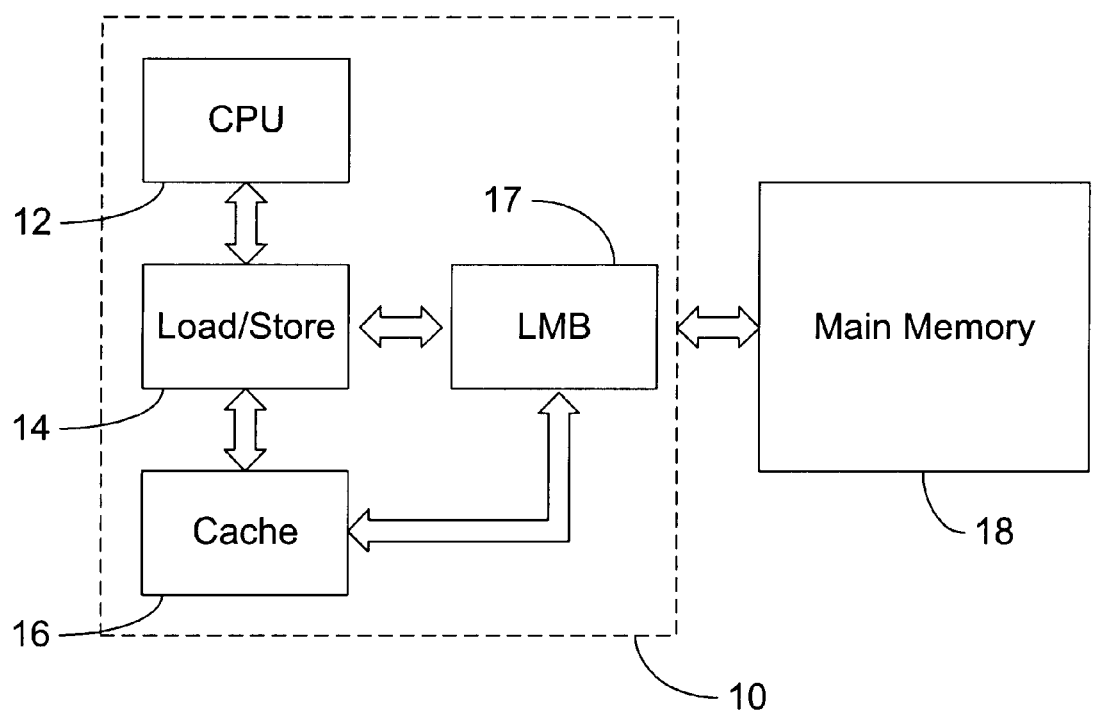
FIG. 1 shows a typical computer system.

Referring to the drawings wherein like reference characters are used for like parts throughout the several views, FIG.

Figure 2:
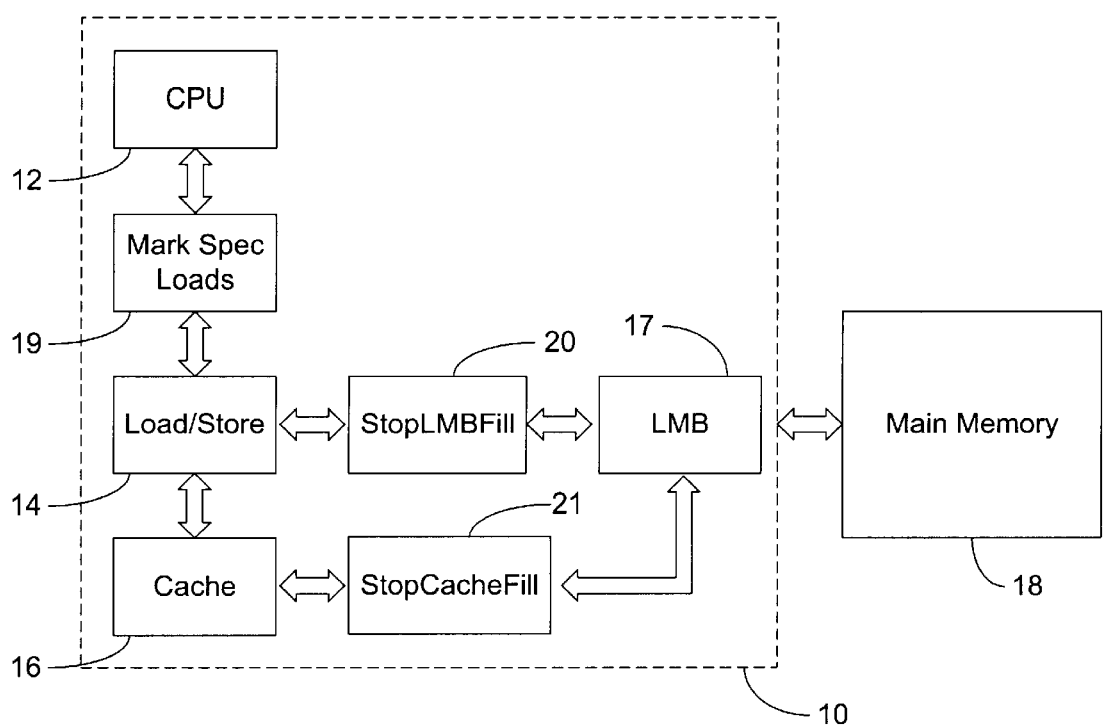
FIG. 2 shows a block diagram for an embodiment of the present invention.

2 is a block diagram of an exemplary embodiment of the present invention. The embodiment shown includes similar components as the typical computer system of FIG. 1, i.e., a microprocessor (10) having, among other things, a CPU (12), a load/store unit (14), an on-board cache memory (16), and a load miss buffer (LMB) (17) for holding loads that miss in the on-board cache while they are accessing main memory. Further, the microprocessor (10) is connected to a main memory (18) that holds data and program instructions to be executed by the microprocessor (10) and functions in a similar manner. The embodiment shown in FIG. 2, however, further includes blocks which mark speculative load (19), prevent the LMB fill (20), and prevent the cache fill (21). The operation of these blocks is described below with reference to embodiments of the designed technique for handling speculative address loads.

Figure 3:
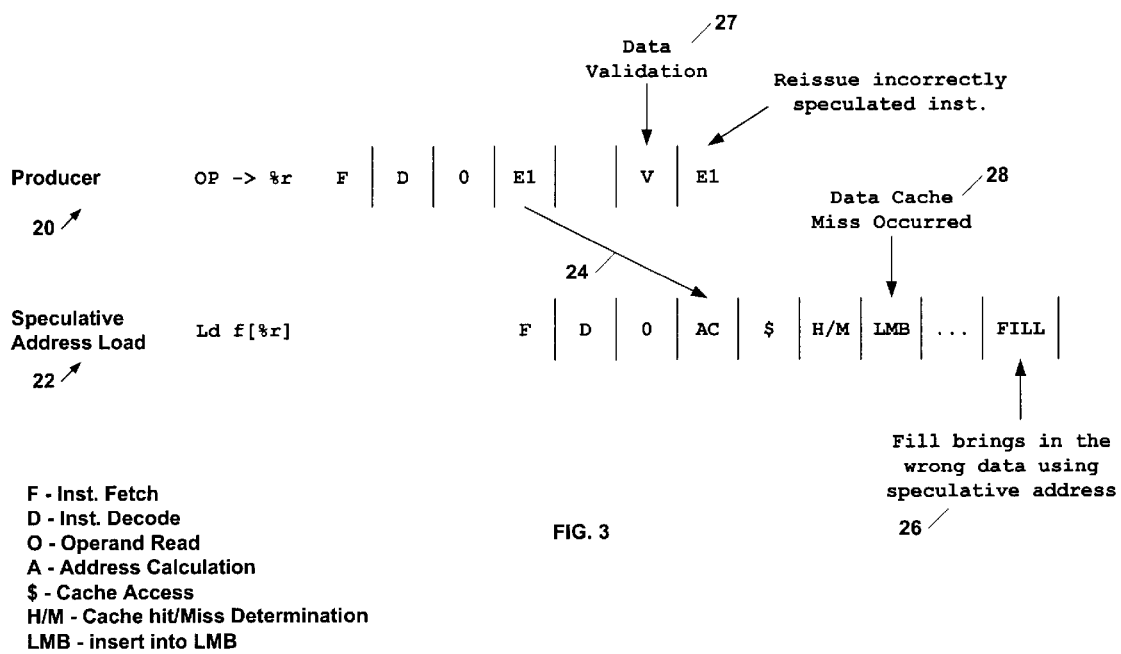
FIG. 3 shows an example speculative address load.

FIG. 3 shows an example of a speculative address load. A producer instruction (20) and a dependent speculative address load (22) are shown. Note that the producer is writing to the register %r while the dependent load is using the register %r to calculate its effective address. The producer generates a speculative result in the fourth pipeline stage of its execution (E1) (24), but this result is not known to be correct until the data validation stage (V) (27) some time later. A non speculative processor would wait until the data is valid before issuing the dependent load. But a speculative processor can choose to issue the dependent speculative address load before it is known that the data is valid.

If the speculation was correct, the processor will execute the job faster. If the speculation was incorrect, the processor reissues the load when the correct data becomes available. However, a side effect of the issuing the load with an incorrect speculative address is that the access to the cache may have altered the cache. This can occur if the speculative load access misses in the cache (28) which causes the processor to bring in data relating to the incorrect effective address (26). Bringing in this data may replace other data in the cache that will be accessed in the near future. So, when the processor goes to access the replaced data, it will no longer be in the cache and will incur a cache miss which would not have occurred without the speculation. This is referred to as "cache pollution."

Using a technique in accordance with an embodiment of the invention, speculative address loads are marked when forwarded speculative data from its producer. Thus, when speculative address loads misses in the cache and speculative data is found to be incorrect, the computer system can prevent the data from the speculative address from being committed to the cache by either preventing the load from entering the LMB or, if the load is already in the LMB, prevent the load from committing the cache. By doing so, pollution of the cache can be avoided.

Figure 4:
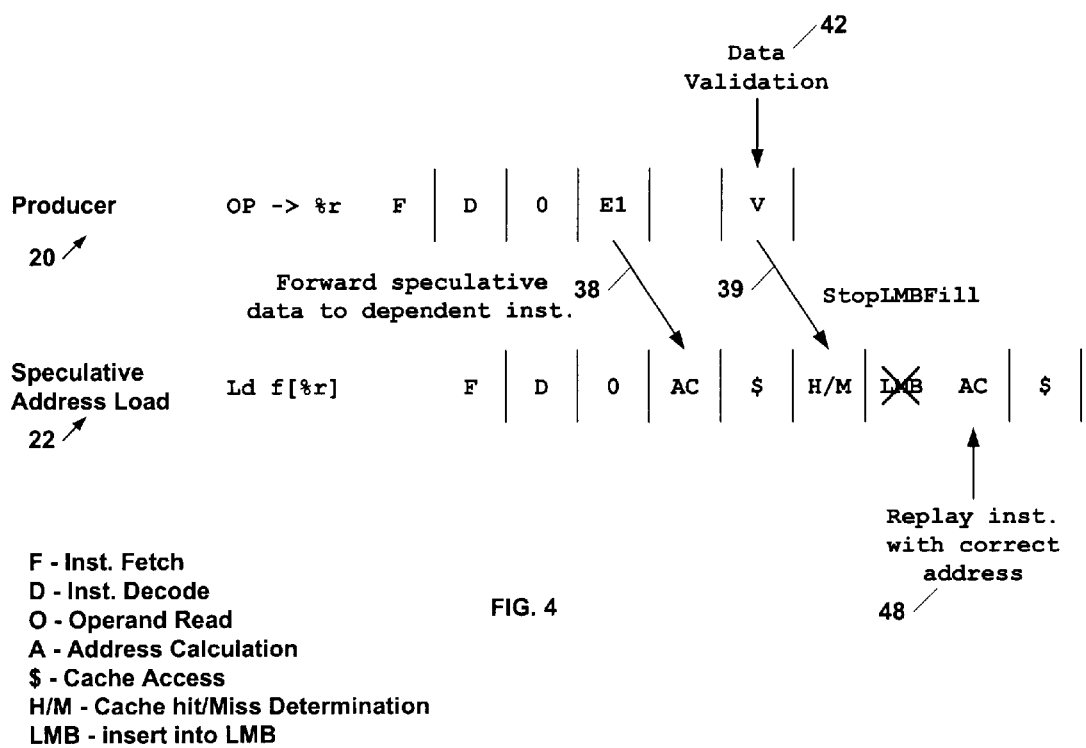
FIG. 4 shows an example speculative address load not inserted into the load miss queue.

Referring to FIG. 4, when a load is forwarded speculative data (38), it is marked as a speculative address load. Then, if this speculative address load incurs a cache miss and the speculative data is found to be incorrect (42), a StopLMBFill signal (39) is issued to prevent the load from entering the LMB. This prevents the access to main memory from being made and, thus, avoids cache pollution.

Figure 5:
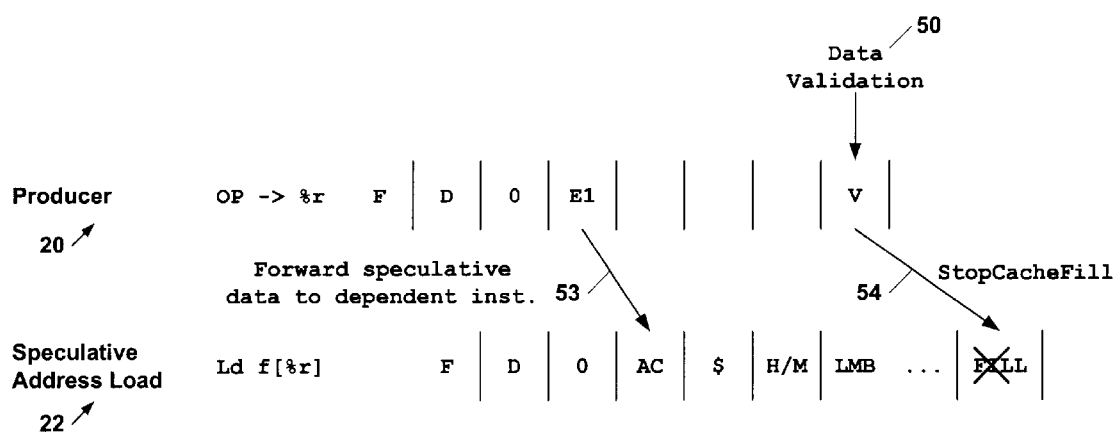
FIG. 5 shows an example speculative address load inserted into the load miss queue.

Referring to FIG. 5, when a load is forwarded speculative data (53), it is marked as a speculative address load. Then, if this speculative address load incurs a cache miss, the speculative data is found to be incorrect (50), and the load has already entered the LMB, this load will be marked in the LMB with a StopCacheFill (54) to prevent the load from committing data to the cache when the access returns from main memory and, thus, avoids cache pollution. This technique is used when the data validation takes a longer time such that the speculative load misses in the cache, has already enter the LMB, and sent an access out to main memory.

Advantages of the present invention may include one or more of the following. In one or more embodiments, speculative address load processing is optimized within a microprocessor by the avoidance of cache pollution. Other aspects and advantages of the present invention will be apparent from the above description and the appended claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of optimizing speculative address load processing by a microprocessor comprising:
    identifying a speculative load;
    marking the speculative load;
    determining whether a cache memory miss occurs for the speculative load; and
    preventing propagation of the speculative load if a cache memory miss occurs by at least one of blocking the speculative load from entering a load miss buffer and blocking the load miss buffer from committing the speculative load to the cache memory.

2. A method of optimizing speculative address load processing by a microprocessor comprising:
    identifying a speculative load;
    marking the speculative load;
    determining whether a miss occurs for the speculative load; and
    preventing use of the speculative load if a miss occurs, wherein preventing use of the speculative load comprises:
        preventing the speculative load from entering a load miss buffer if a miss occurs.

3. A method of optimizing speculative address load processing by a microprocessor comprising:
    identifying a speculative load;
    marking the speculative load;
    inserting the marked speculative load into a load miss queue;
    determining whether a miss occurs for the speculative load; and
    preventing the marked speculative load miss queue from committing the speculative load to cache if a miss occurs.

4. The method of claim 3 further comprising:
    preventing the marked speculative load miss queue from committing the speculative load to cache if a miss occurs and speculative data forwarded from a producer is incorrect.

5. A system for optimizing speculative address load processing by a microprocessor comprising:
    means for identifying a speculative load;
    means for marking the speculative load;
    means for caching data;

means for holding loads that miss in the means for caching data;

means for determining whether a miss occurs for the speculative load; and means for preventing propagation of the speculative load if a miss occurs in the means for caching data by at least one of blocking the speculative load from entering the means for holding and blocking the means for holding from committing the speculative load to the means for caching.

6. A system for optimizing speculative address load processing by a microprocessor comprising:

means for identifying a speculative load;

means for marking the speculative load;

means for determining whether a miss occurs for the speculative load; and means for preventing use of the speculative load if a miss occurs, wherein the means for preventing use of the speculative load comprises:

preventing the speculative load from entering a load miss buffer if a miss occurs.

7. A system for optimizing speculative address load processing by a microprocessor comprising:

means for identifying a speculative load;

means for marking the speculative load;

means for inserting the marked speculative load into a load miss queue;

means for determining whether a miss occurs for the speculative load; and means for preventing the load miss queue from committing the marked speculative load to cache if a miss occurs.

8. The system of claim 7 further comprising:

means for preventing the marked speculative load miss queue from committing the speculative load to cache if a miss occurs and speculative data forwarded from a producer is incorrect.

9. A microprocessor having a cache memory and operatively connected to a main memory, the microprocessor comprising:

a central processing unit arranged to issue a speculative load with an effective address generated from speculative data;

circuitry arranged to mark the speculative load; and circuitry arranged to prevent the marked speculative load from polluting the cache memory if a cache memory miss occurs for the speculative load.

10. The microprocessor of claim 9, further comprising:

a load miss buffer arranged to hold loads that miss in the cache memory.

11. The microprocessor of claim 10, wherein the circuitry arranged to prevent the marked speculative load from polluting the cache memory comprises:

a stop load miss buffer unit arranged to prevent the marked speculative load from entering the load miss buffer if the cache memory miss occurs.

12. The microprocessor of claim 10, wherein the circuitry arranged to prevent the marked speculative load from polluting the cache memory comprises:

a stop cache fill unit arranged to prevent the marked speculative load from being committed to the cache memory from the load miss buffer if the cache memory miss occurs.

* * * * *